United States Patent [19]

Reid

[11] Patent Number: 5,441,140

[45] Date of Patent: * Aug. 15, 1995

[54] ESCALATORS

[75] Inventor: John A. Reid, Auckland, New Zealand

[73] Assignee: Escalator Advertising Limited, Auckland, New Zealand

[*] Notice: The portion of the term of this patent subsequent to Jan. 5, 2010 has been disclaimed.

[21] Appl. No.: 287,884

[22] Filed: Aug. 9, 1994

[30] Foreign Application Priority Data

Aug. 11, 1993 [NZ] New Zealand .................. 248387

[51] Int. Cl.$^6$ ............................................. B66B 23/12
[52] U.S. Cl. ................................................ 198/333
[58] Field of Search ...................................... 198/333

[56] References Cited

U.S. PATENT DOCUMENTS 5,176,239 1/1993 Findlay et al. .............. 198/333 X
5,337,879 8/1994 Fischer ............................ 198/333

FOREIGN PATENT DOCUMENTS 4314772 11/1993 Germany ........................ 198/333
0197298 8/1989 Japan ............................ 198/333
2061215 5/1981 United Kingdom ........... 198/333
2137580 10/1984 United Kingdom ........... 198/333
1418250 8/1988 U.S.S.R. ........................ 198/333
8204240 12/1982 WIPO ............................ 198/333

Primary Examiner—James R. Bidwell
Attorney, Agent, or Firm—Young & Thompson

[57] ABSTRACT

A method for modifying an escalator step having an external profile including a substantially smooth riser face and a substantially straight rear edge. A part of the riser face is replaced by fixing a backing plate behind the riser and a cover corresponding to the removed part of the riser face and further including a plurality of cleats and channels therein.

5 Claims, 5 Drawing Sheets

ESCALATORS

FIELD OF THE INVENTION

This invention relates to the field of escalators, and more particularly to improved means for safety on an escalator.

BACKGROUND OF THE INVENTION

International application PCT/GB92/01037 published under the Patent Cooperation Treaty WO92/22491 discloses an escalator with interacting steps, wherein each step includes an advertising sign on the riser, and a transparent, cleated cover over the sign.

OBJECT OF THE INVENTION

It is a further object for the present invention to go at least partway towards providing novel or improved means for safety on an escalator or, at least to provide the public with a useful choice.

SUMMARY OF THE INVENTION

In one aspect the present invention provides a method for modifying a passenger conveying device such as an escalator or travelator having a plurality of interacting movable steps each said step having an external profile allowing relative movement between adjacent steps, said profile including a substantially smooth riser face and a substantially straight rear edge, said riser face of each step passing in close proximity to the said rear edge of an adjacent step in use, comprising the steps of modifying said riser face and modifying said rear edge in a complementary manner, characterised in that said riser face is modified by the steps of removing at least part of said riser face, fixing a backing plate behind said riser, and fitting a cover to the step, said cover substantially corresponding to the removed part of said riser face and further including a plurality of cleats and channels therein.

Preferably the rear edge is modified by the step of providing slots in the rear edge, each slot being complementary to a cleat on the cover.

Preferably the backing plate supports a seal, and the cover is fitted against and engaged with the seal.

In a further aspect the invention provides at least one component for a passenger conveying device such as an escalator or travelator or an escalator or an escalator step or any one of the features, items, components, or component assemblies substantially as herein described.

In a yet further aspect the invention provides a method for modifying a passenger conveying device such as an escalator or travelator substantially as herein described or illustrated with reference to any one of the accompanying drawings.

In another aspect the present invention provides a passenger conveying device modified in accordance with the above method.

More particularly the invention provides an escalator step modified in accordance with any one of the methods described or illustrated with reference to any one of the accompanying drawings.

In a still further aspect the invention provides a passenger conveying device containing one or more of such modified steps in accordance with the description herein.

BRIEF DESCRIPTION OF THE DRAWINGS

The following is a description of preferred forms of the present invention, given by way of example only, with reference to the accompanying drawings, in which.

DETAILED DESCRIPTION OF THE INVENTION

Most of the modern steps today comprise a cleated tread and riser surface. The cleats on the riser surface complement the cleats at the rear edge of the tread of the adjacent step below. The purpose of this complementary relationship is to prevent objects falling in between the steps while the escalator is moving, thus preventing an object from jamming the relative up and down movements of the steps and minimising the risk of serious accidents.

Figure 1:
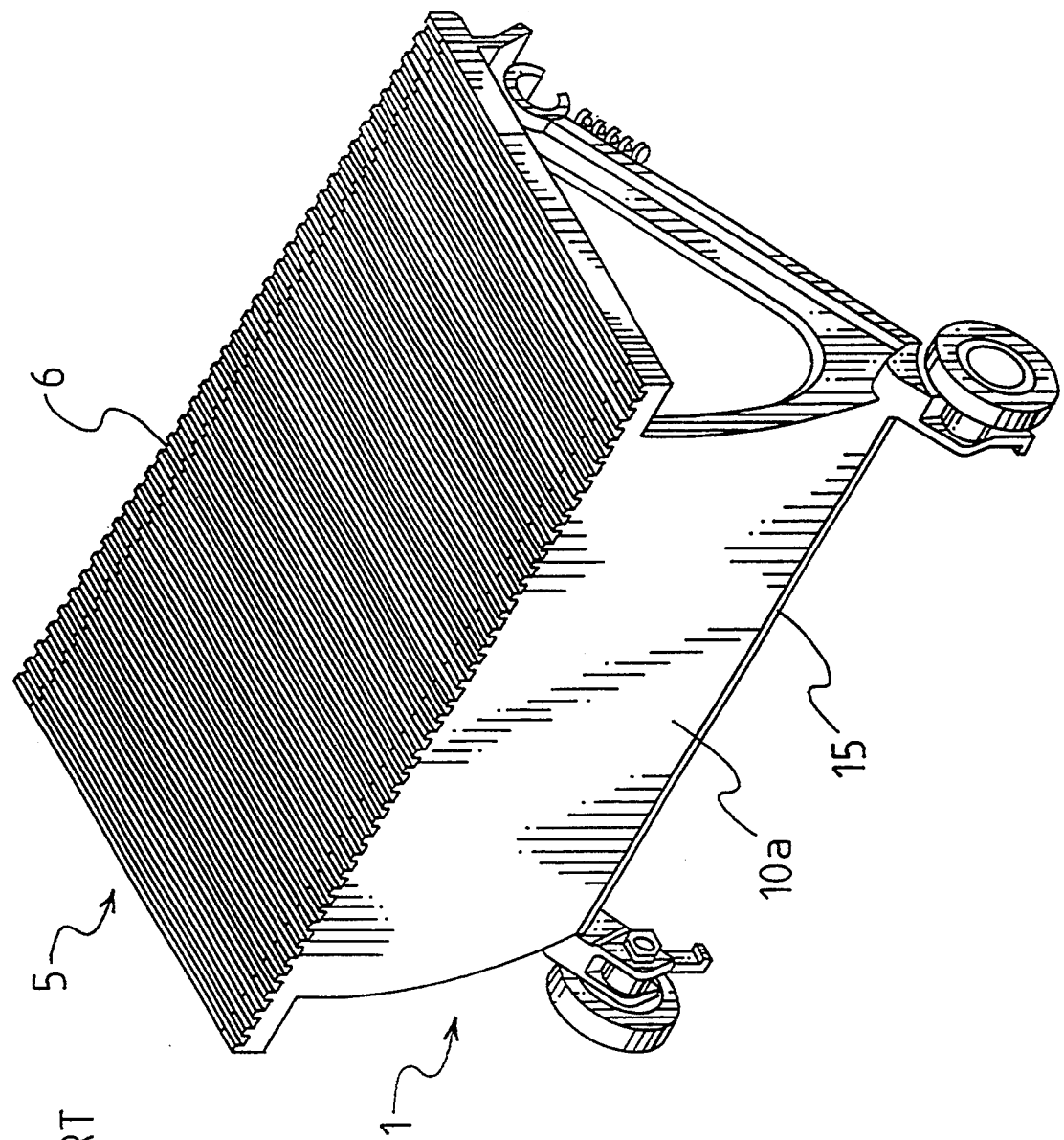
FIG. 1 shows a prior art escalator step in front perspective view.

Nevertheless, a number of older escalators consist of a cleated tread surface and a smooth riser surface. FIG. 1 illustrates a one-piece die-cast escalator step 1 having a cleated tread 5 and smooth riser face 10A. In view of more stringent safety requirements for escalator steps and new developments in legislation in many overseas countries in relation to the British standard "Safety Rules for the Construction and Installation of Escalators and Passenger Conveyors", those escalator steps with smooth riser surfaces may need to be provided with a cleated riser surface.

Under those circumstances, any building owner is likely to incur significant costs in replacing his escalator steps to meet new developments in safety requirements for escalators. Consequently, there is a need to provide an economical and effective means of converting escalator steps with smooth riser surfaces to cleated risers, which the present invention in its preferred form is intended to go at least partway towards meeting.

The following description would apply to both a one-piece die-cast escalator step and a modular die-cast step. A sub-frame modular escalator step is not dissimilar to the step illustrated in FIG. 1 and differs only in that the escalator step would be constructed in two or three segments placed side by side, each with its own demountable riser and tread parts. The aforementioned segments are fixed together under the step to make one complete escalator step.

Figure 2:
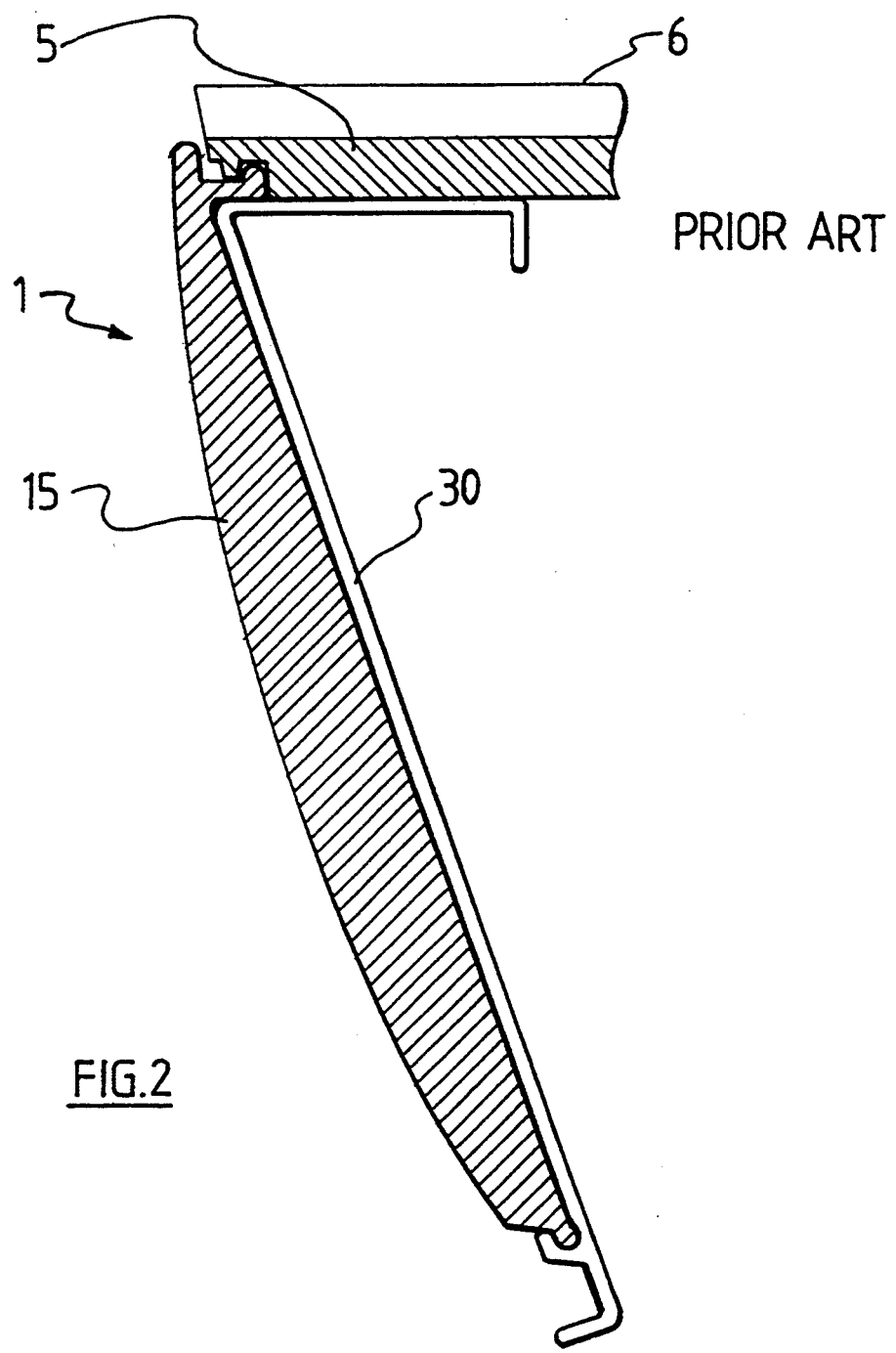
FIG. 2 shows a second escalator step in side view.

FIG. 2 illustrates an escalator step 1 with a modular sub-frame design wherein the riser 15 and tread 5 can be unbolted and removed from the sub-frame 30. To remove the riser 15, the tread 5 must first be unfastened from the sub-frame 30 and lifted to disengage the top of the riser 15.

Figure 3:
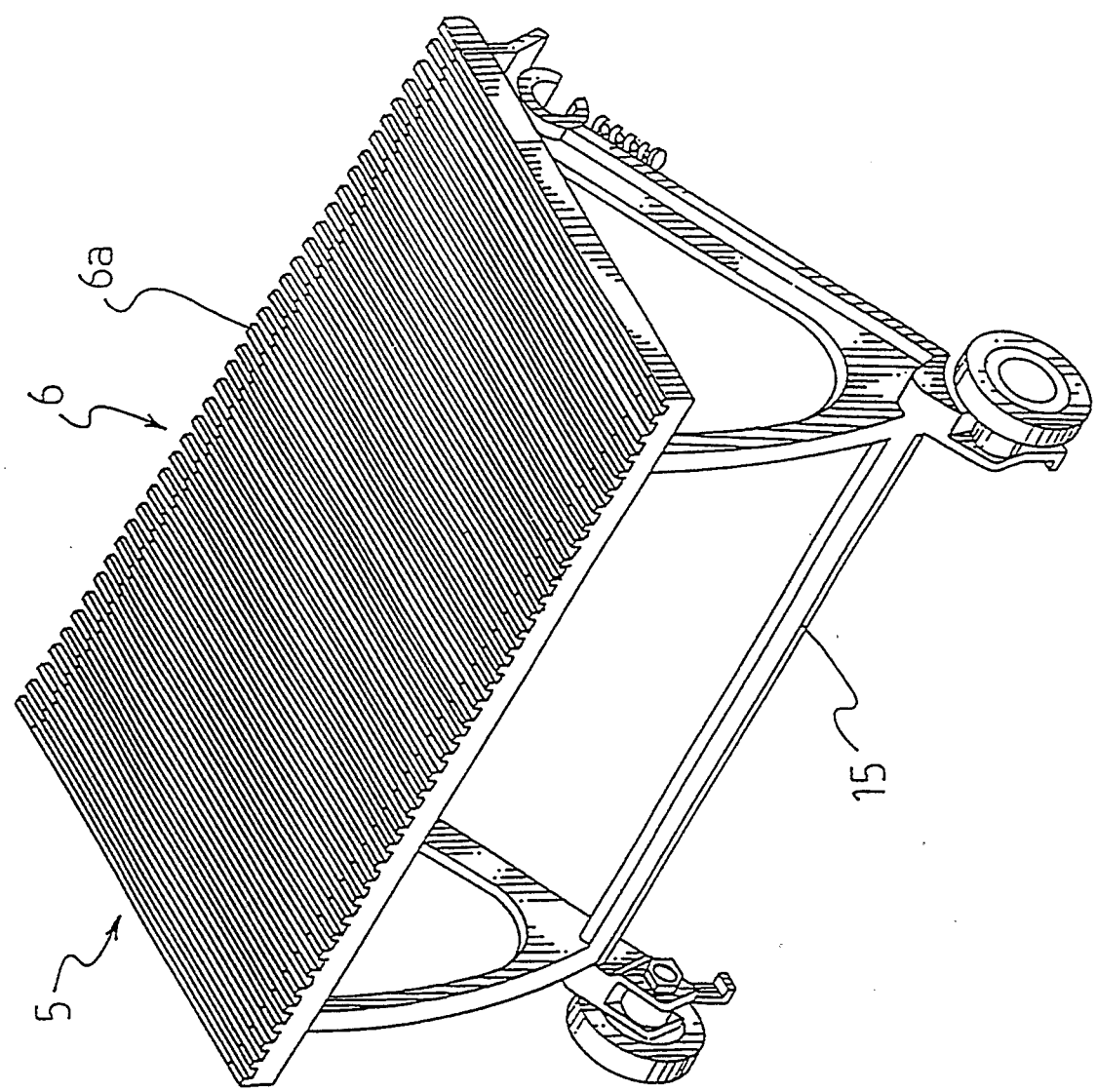
FIG. 3 illustrates the escalator step of FIG. 1 cut away in accordance with the present invention.
Figure 6:
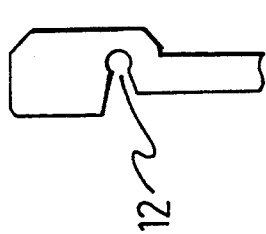
FIG. 6 shows a preferred channel section.
Figure 5:
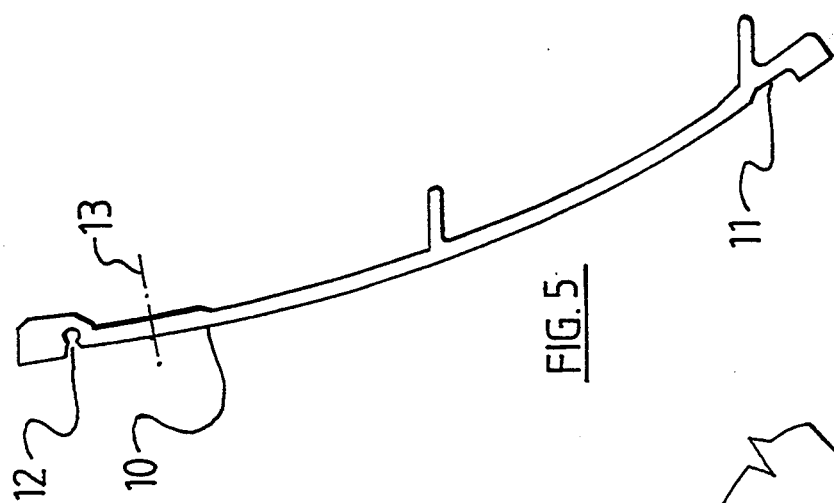
FIG. 5 illustrates a preferred backing plate in side view.

As illustrated in FIG. 3 a preferred form of the present invention shows an escalator step in side view wherein the riser has been cut away or removed.

Preferably, a flat riser surface on a die-cast escalator step is removed by milling away the riser face, substantially retaining however the outer wheel struts.

Substantially the whole riser is removed. Preferably, machining is performed in a manner which ensures uniformity from step to step. A lateral cut is made along the tread and wheel edge of the riser between the outer struts of the steps so that the original reinforcing riser gussets (not shown) in line with the wheel struts are left intact, preferably leaving at least a 20 mm overlap area for mounting new extruded backing plate 10.

In the case of a sub-frame step as shown in FIG. 2 no milling is required, and the riser can simply be unbolted and discarded.

Figure 4:
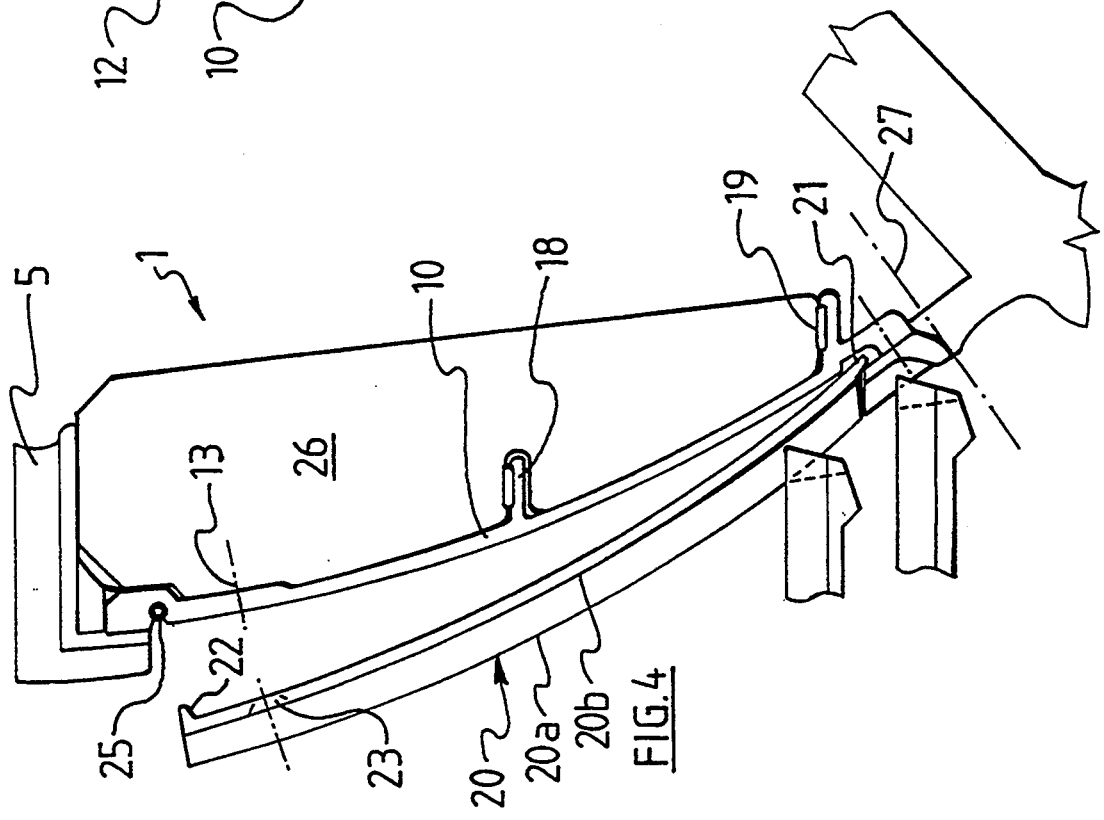
FIG. 4 illustrates a step modified according to the present invention in side view.
Figure 7:
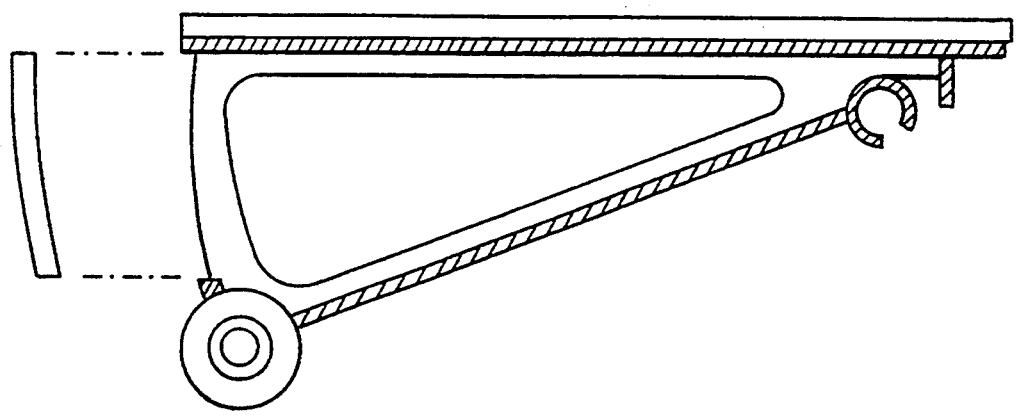
FIG. 7 shows a milled step in side view.

FIG. 4 illustrates the modified riser step of FIG. 3 in side view and section, having new inserted extruded backing plate 10, gusset(s) 26, cleated cover plate 20, and weather seal 25.

The backing plate 10 preferably comprises an extrusion of (for example) aluminium, and is provided with a curvature generally corresponding to the inside face of the original riser 10a. It is preferably retained in place at a top edge by an overhanging front lip of the tread 5, and fixed in position by one or more bolts or other fasteners 27 at a lower edge as shown. One or more gussets 26 extending vertically behind the backing plate 10 may be fixed to it with welds 19 to one or more lugs 18 projecting from the backing plate 10, and to the underside of the tread 5.

Backing plate 10 preferably includes a channel section 11 which runs along its wheel edge for substantially the entire length of the plate. The channel section is preferably adapted to receive a corresponding downwardly projecting lateral ridge 21 at the lower edge of cover plate 20. This cooperative arrangement is preferred because the cover plate can be held in place without the need for fasteners at its base. Alternative methods of supporting the cover plate at its wheel edge may also be suitable however those methods which incorporate the use of base fasteners are considered less efficient and therefore less preferred at present.

At the upper tread edge, the backing plate 10 further includes a channel section 12 into which is preferably placed a weather seal 25. The weather seal is in this example a hollow tube and can be manufactured from suitable synthetic materials, rubber or nylon material, having an appropriate degree of flexibility and bias. The weather seal is preferred particularly in relation to outdoor escalators such as those escalators in underground sub-ways etc. Preferably the weather seal would include or act also as a flame retardant.

The weather seal 25 is adapted to cooperatively interact with a rearwardly projecting lateral ridge 22 on the back of the cover plate 20, so that in use when the cover plate is secured onto the step, the weather seal is able to substantially prevent entry of fine particles of dirt and dust and moisture between the cover plate and the backing plate. Dust particles or moisture behind the cover plate detract from the appearance of indicia displayed there. Using a weather seal substantially reduces the amount of dirt and moisture entering behind the cover plate.

Cover plate 20 is preferably transparent and provides a hard wearing, non-scratch cleated surface. Preferred materials for these cover plates are polycarbonate materials, because of the many varieties of end product which can be achieved using appropriate plastics materials. It will be apparent that other suitable materials may be used such as toughened glass or resin material, whether transparent, translucent, or opaque.

Alternatively, the cover plates could be manufactured from metal material or the like.

Preferably, the cover plate is shaped so as to substantially replicate the radius of the original riser, either with cleats 20a projecting beyond the radius of the original riser, or with channels 20b inset relative to that radius. Corresponding modifications may also be made to the lip of the tread 5, to match the cleats and channels.

Preferably the rear edge 6 of the upper tread 5 has a toothed profile, complementary to the cleated cover plate 20, so that the rear edge 6 of each step intermeshes with the cleated front face of the adjacent step above. This reduces any transverse movement of one step relative to the adjacent steps while the escalator is moving, and also prevents paper or other flat objects from slipping in between adjacent steps.

This could be achieved by attaching a die-cast or machined lateral strip, with rearwardly projecting teeth, along the rear edge 6 of the tread 5, to create an appropriate profile. In this case, the cleated cover plate 20 would need inset channels 20b between cleats 20a, with the front face of the cleats 20a lying flush with the original smooth riser face 10a of the riser 15.

Alternatively, slots 6a could be machined into the rear edge 6 of each tread 5, corresponding with the cleats 20a on the cover plate 20, as shown in FIG. 2a. In this case, the channels between cleats 20a may lie substantially flush with the original riser face 10a of the riser 15, while the cleats 20a project proud of the original face. This arrangement is currently preferred.

As a further alternative, the entire tread 5 could be removed and replaced with a new tread having a suitable profile at the rear edge, to match either inset channels 20b or projecting cleats 20a on the cover plate 20.

As shown in FIG. 4 the cover plate 20 is fastened to plate 10 by way of suitable fasteners such as DZUS screws which extend through counter sunk openings 23 in a number of the grooved portions in the cover plate (not shown) and screw into corresponding openings in the backing plate. DZUS screws are preferred because they provide a tamper-proof fastening system which is quick release and vibration proof.

Riser cover plates are preferably manufactured in short sections, so that two or three plates are required for example to restore the riser profile on a one meter long step. The grooved portions on the side edge of each plate are preferably cut so that adjacent plates can be overlapped and inserted to restore the original riser.

Alternatively, a one piece cleated cover plate could be used. Preferably substantially all components are pre-fabricated for modification of each model of step.

It will be appreciated that a wide variety of changes and modifications might be made to the above examples within the general scope of the invention.

Other modifications might also be made to the modified riser design including the backing plate, weather seal and cover plate, to suit other specific types of escalator steps in the world. The general scope of the invention, encompassing all such modifications, may be characterised by the following claims.

What we claim is:

1. A method for modifying a passenger conveying device such as an escalator or travelator having a plurality of interacting movable steps (1) each said step having an external profile allowing relative movement between adjacent steps, said profile including a substantially smooth riser face (10a) and a substantially straight rear edge (6), said riser face of each step passing in close proximity to the rear edge of an adjacent step in use, comprising: modifying said riser face and modifying said rear edge in a complementary manner, wherein said riser face is modified by removing at least part of said riser face, fixing a backing plate (10) behind said riser, and fitting a cover (20) to the step, said cover substantially corresponding to the removed part of said riser face and further including a plurality of cleats (20a) and channels (20b) therein.

2. A method as claimed in claim 1, wherein said rear edge is modified by providing slots (6a) in said rear edge, each said slot being complementary to a cleat (20a) on said cover.

3. A method as claimed in claim 1 wherein said backing plate 10 supports a seal (25), and said cover (20) is fitted against and engaged with said seal.

4. A step for a passenger conveying device such as an escalator or travelator, said step having an external profile including a substantially smooth riser face and a substantially straight rear edge, said riser face having at least part of said riser face removed, a backing plate fixed behind said riser face, and a cover fitted to said step, said cover substantially corresponding to the removed part of said riser face and further including a plurality of cleats and channels therein.

5. A passenger conveying device such as an escalator or travelator having a plurality of interacting movable steps, each said step having an external profile allowing relative movement between adjacent steps, said profile including a substantially smooth riser face and a substantially straight rear edge, said riser face of each step passing in close proximity to the rear edge of an adjacent step in use, said riser face having at least part of said riser face removed, a backing plate fixed behind said riser, and a cover fitted to the step, said cover substantially corresponding to the removed part of said riser face and further including a plurality of cleats and channels therein.

* * * * *